United States Patent [19]

Sterzer

[11] 3,805,125

[45] Apr. 16, 1974

[54] SEMICONDUCTOR MEMORY ELEMENT

[75] Inventor: Fred Sterzer, Princeton, N.J.

[73] Assignee: RCA Corporation, New York, N.Y.

[22] Filed: Mar. 30, 1973

[21] Appl. No.: 346,669

[52] U.S. Cl. .. 317/234 V, 340/173 NR, 331/107 G, 307/299

[51] Int. Cl. .......................... H01l 5/00, G11c 11/40

[58] Field of Search ............. 317/234 V; 331/107 G; 307/299; 340/173 NR

[56] References Cited

UNITED STATES PATENTS

| | | | |
|---|---|---|---|
| 3,452,221 | 6/1969 | Gunn | 340/173 NR |
| 3,462,617 | 8/1969 | Shoji | 317/234 V |
| 3,528,035 | 9/1970 | Venohara | 317/234 V |
| 3,597,625 | 8/1971 | Yanai | 317/234 V |

*Primary Examiner*—Terrell W. Fears
*Attorney, Agent, or Firm*—Glenn H. Bruestle; Donald S. Cohen

[57] ABSTRACT

The memory element makes use of two transferred electron devices, at least one of which is notched. The transferred electron devices are connected in a feedback arrangement in order to trigger one another. The memory element can be used for processing extremely high speed signals.

11 Claims, 15 Drawing Figures

SEMICONDUCTOR MEMORY ELEMENT

BACKGROUND OF THE INVENTION

The present invention relates to semiconductor memory elements and in particular relates to semiconductor memory elements of the type using transferred electron devices as storage elements for extremely high speed computational purposes.

A semiconductor memory element is used in electronic circuits as a storage device. Such elements are commonly used in computers and digital equipment. Heretofore, semiconductor memory elements were comprised of junction semiconductor devices which limited the speed of operation of such devices.

SUMMARY OF THE INVENTION

A semiconductor memory element is presented which comprises a first circuit having an output terminal for producing an output voltage and an input terminal for receiving an input signal. The first circuit includes a transferred electron device having an anode, a cathode, and means between the anode and cathode responsive to the arrival thereat of a traveling domain for causing a change in the output voltage produced by the circuit.

The memory element further comprises a second circuit having an output terminal for producing an output voltage and an input terminal for receiving an input signal. The second circuit includes a transferred electron device having an anode, a cathode, and means coupled between the anode and cathode for establishing a domain therein which travels from the cathode of the device toward the anode thereof.

The memory element further comprises means coupled between the output terminal of the first circuit and the input terminal of the second circuit responsive to the change of the output voltage of the first circuit which change occurs when the traveling domain reaches the means between the anode and the cathode of the first device for establishing a domain in the second device which travels from the cathode toward the anode of the second device.

The memory element further comprises means coupled between the output terminal of the second circuit and the input terminal of the first circuit responsive to the establishment of the domain in the second device for establishing a domain in the first device which travels from the cathode toward the anode of the first device.

DETAILED DESCRIPTION OF THE DRAWINGS

Figure 1:
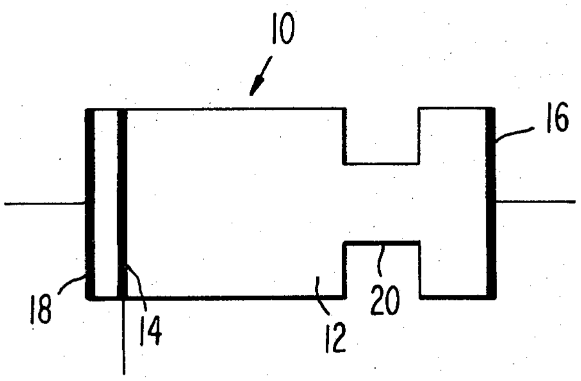
FIG. 1 is a schematic representation of one type of shaped transferred electron device.
Figure 2:
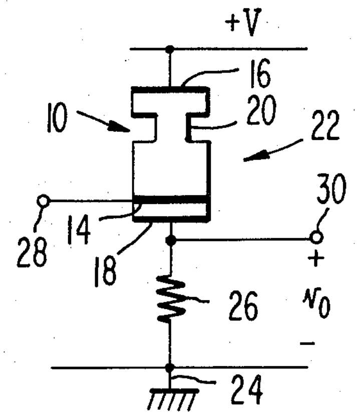
FIG. 2 is a circuit including the transferred electron device of FIG. 1.
Figure 3:
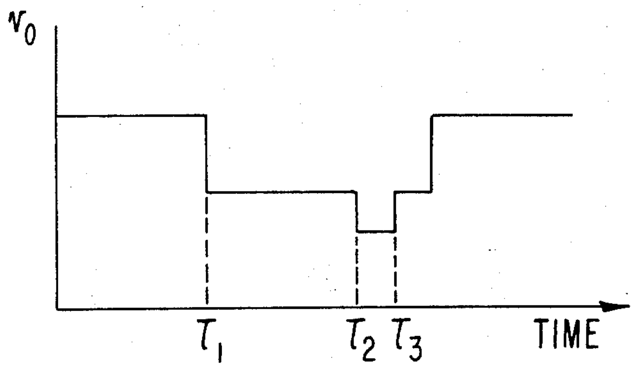
FIG. 3 is the output waveform of the circuit of FIG. 2.

Referring generally to FIGS. 1, 2, and 3, a three-terminal notched transferred electron device (hereinafter TED) 10 is shown. The TED 10 comprises a body 12 of a semiconductor material such as gallium arsenide, indium phosphide, or other III–V compound which exhibits the transferred electron effect. On the body 12 of the device 10 are a metal strip gate 14, an anode 16, and a cathode 18. The body 12 further comprises a notch 20 proximate the anode 16 end of the device 10.

Referring generally to FIGS. 2 and 3, the schematic of a circuit 22 illustrating the use of the device 10 of FIG. 1 is shown. The circuit 22 includes a DC supply voltage, +V, connected to the anode 16 of the device 10. The cathode 18 of the device 10 is connected to one terminal of a resistor 26 whose other terminal is connected to a ground terminal 24. The circuit 22 has an input terminal 28 which is connected to the gate 14 of the device 10. An output terminal 30 is connected to the cathode 18 of the device 10.

A three-terminal TED, like a two-terminal TED, has the characteristic of domain nucleation upon the imposition of an electric field which exceeds a threshold level. A domain will be nucleated at the cathode 18 of the device 10 and this domain will travel toward the anode 16 where it will be collected. During the time that one domain is traveling through the device, another domain cannot be nucleated. Thus, if a constant bias voltage greater than the required threshold voltage is imposed between the anode and the cathode of the device, the device will oscillate with a frequency characteristic of that device.

If the gate is a Schottky barrier gate, it is possible to segregate the input and the output of the device without using a circulator device which is done for two-terminal TED devices. When operating a three-terminal TED having a Schottky barrier gate, there is imposed across the device a voltage such that a field exists directed from the anode to the cathode of the device with a magnitude greater than the domain sustaining field for the device but less than the threshold field for the device. When a voltage is imposed upon the Schottky barrier gate which is negative with respect to the voltage at the cathode of the device, a depletion region will be formed under the gate. This depletion region causes the electric field lines existing within the device to be concentrated in that portion of the device under the depletion region. The concentration of electric field lines under the depletion region will exceed the threshold field for nucleating domains when a sufficiently negative voltage has been imposed upon the gate. The time required for domain nucleation has been shown experimentally to be on the order of 40 picoseconds. For purposes of clarity, this inherent device delay will be omitted in the remaining portions of this description as well as in the figures. However, it should be recognized that this delay does exist in these devices.

When a domain has been nucleated within a TED, the device exhibits a reduction in current flow until such time as the domain has been collected at the anode of the device. Furthermore, when a shape is introduced into the body of the device, the current characteristic will follow the shape of the device. In particular, if a notch is cut into the body of the device, the current characteristic through the device will have a "notch" as will be seen later in this description.

Referring generally to FIGS. 2 and 3, if a negative input voltage exceeding the required threshold for the device 10 is imposed upon the input 28 of the circuit 22, the output voltage $v_o$, measured between the output terminal 30 and the ground terminal 24 will have the waveform shown in FIG. 3. As shown, the waveform has a quiescent value until time $\tau_1$ when a domain is nucleated by the electric field produced by the input voltage. Thereafter, the output voltage, $v_o$, will have a value lower than the quiescent value until time $\tau_2$ when the domain reaches the notch 20 in the device 10. At that time the output voltage, $v_o$, will fall to a lower value until time $\tau_3$ when the domain has traversed the notch 20 in the device. When the domain reaches the anode 16 it is collected and the output voltage, $v_o$, returns to the initial quiescent level.

Figure 4:
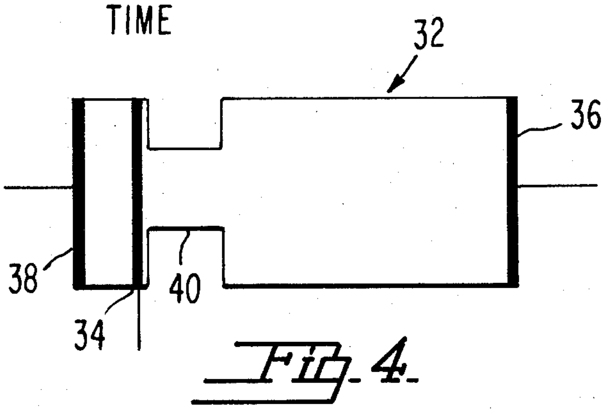
FIG. 4 is a schematic representation of a second type of transferred electron device.

Referring generally to FIG. 4, a second type of three-terminal notched TED 32 is shown. This device 32 also has a gate 34, an anode 36, and a cathode 38. Furthermore, this device 32 also has a notch 40, but the notch 40 in this device 32 is proximate the gate 34.

Figure 5:
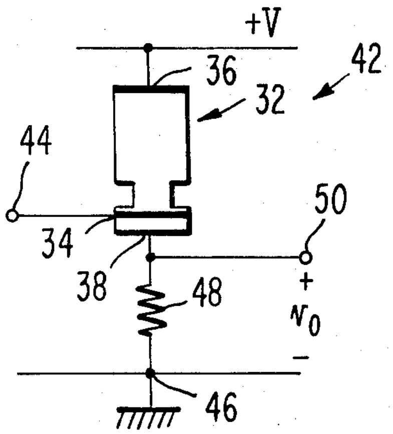
FIG. 5 is a schematic representation of a circuit employing the transferred electron device of FIG. 4.
Figure 6:
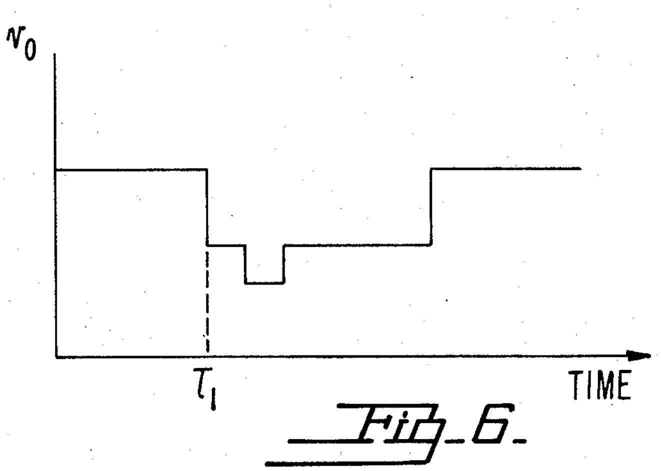
FIG. 6 is the output waveform of the circuit of FIG. 5.

Referring generally to FIGS. 5 and 6, the device 32 of FIG. 4 is shown in a circuit 42. The circuit 42 has an input terminal 44 connected to the gate 34 of the device 32 and an output terminal 50 connected to the cathode 38. The circuit 42 further includes a DC bias supply voltage, +V connected to the anode 36 of the device 32. A resistor 48 is connected between the cathode 38 of the device 32 and the negative terminal of the bias supply which is connected to the ground terminal 46. Following the previous discussion, the device 32 will have a current characteristic similar to that of the circuit 22 following the nucleation of domains. The waveform of the output voltage, $v_o$, taken between output terminal 50 and the ground terminal 46 of the circuit 42 is illustrated in FIG. 6. If an input pulse is imposed upon the input terminal 44 at time $\tau_1$, the resultant output voltage, $v_o$, can be represented by the waveform of FIG. 6.

Figure 7:
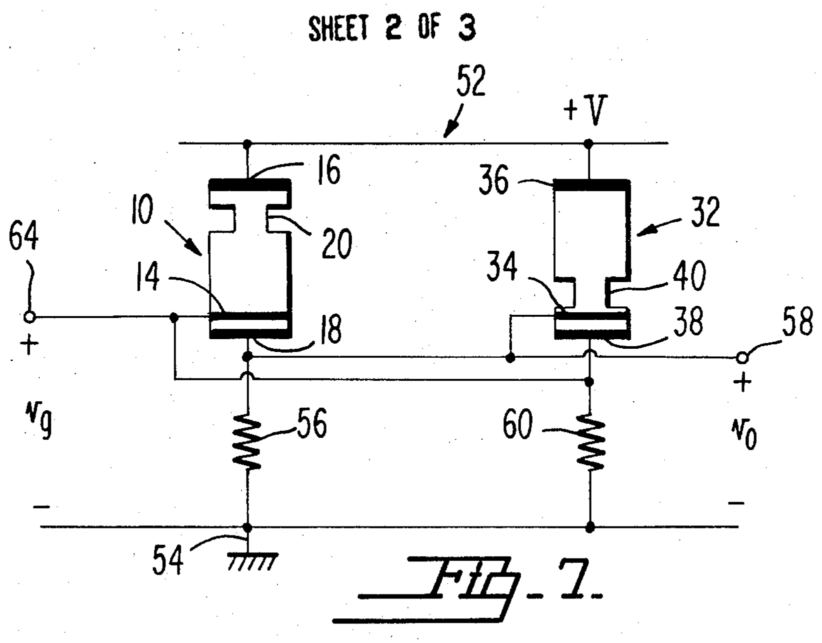
FIG. 7 is a schematic illustration of one embodiment of the present invention.

Referring generally to FIG. 7, one embodiment of the semiconductor memory element 52 of the present invention is shown. The memory element 52 comprises a first notched three-terminal TED 10 of the type shown in FIG. 1 and a second notched TED 32 of the type shown in FIG. 4. The anodes 16, 36 of the TED's 12, 32 are connected together and to a positive DC supply voltage, +V. The cathode 18 of the first TED 10 is connected to one terminal of a resistor 56 whose other terminal is connected to a ground terminal 54. The cathode 18 of the first TED 10 is also connected to the gate 34 of the second TED 32 and to the output terminal 58 of the memory element 52. The gate 14 of the first TED 10 is connected in a feedback arrangement to the cathode 38 of the second TED 32 as well as to one terminal of a resistor 60 whose other terminal is connected to the ground terminal 54. An input terminal 64 is connected to the gate 14 of the first TED 10.

In the operation of the memory element 52, there will be an output voltage, $v_o$, between the output terminal 58 and the ground terminal 54 corresponding to the voltage across the resistor 56. Likewise, there will be a voltage, $v_g$, between the gate 14 of the first transferred electron device 10 and the ground terminal 54. Quiescently, the voltages $v_o$ and $v_g$ will have relatively high constant values corresponding to the "OFF" state of the memory element 52. These voltages, $v_o$ and $v_g$ will have time varying low values corresponding to the "ON" state of the memory element 52 as will be explained and shown in FIG. 8.

Figure 8:
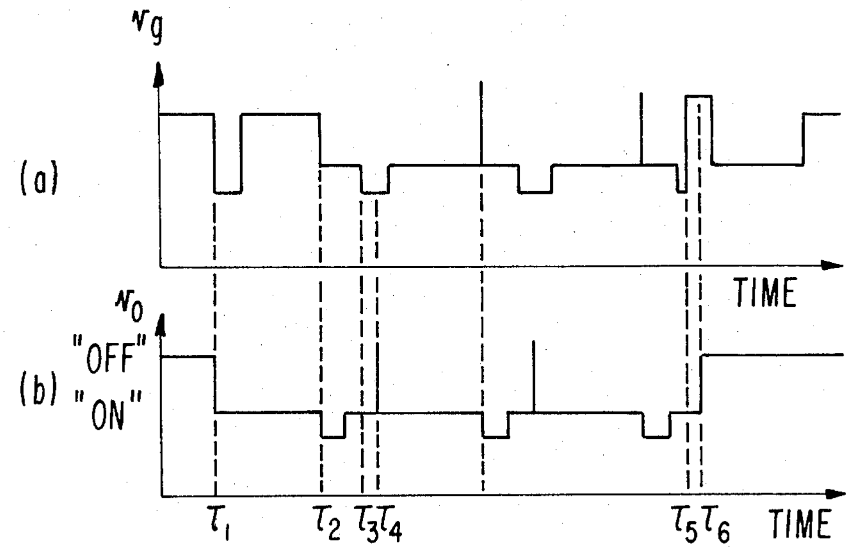
FIGS. 8(*a*) and (*b*) are voltage waveforms illustrating the operation of the circuit of FIG. 7.

Referring generally to FIGS. 7 and 8, if a negative input pulse of sufficient magnitude to nucleate a domain is imposed upon the input terminal 64 to the memory element 52, at time $\tau_1$, as shown in FIG. 8(*a*), the voltage, $v_g$, at the gate 14 of the first TED 10 will drop corresponding to the negative pulse at the input terminal 64. A domain is nucleated within the first TED 10 thereby causing the output voltage, $v_o$, between the output terminal 58 and ground 54 to assume the waveform shown in FIG. 8(*b*). At time $\tau_2$, the domain nucleated within the TED 10 will reach the notch 20 thereby causing the output voltage, $v_o$, to drop as shown in FIG. 8(*b*). This drop in the output voltage, $v_o$, is transmitted to the gate 34 of the second TED 32, thereby causing a domain to be nucleated within the second TED 32. The voltage, $v_g$, across the resistor 60 will then assume the waveform originally shown in FIG. 6. The voltage, $v_g$, across the resistor 60 is coupled in a feedback arrangement to the gate 14 of the first TED 10. Thus, when the domain which had been nucleated in the first TED 10 reaches the anode 16 of this device 10 at time $\tau_4$, the negative pulse of the gate voltage, $v_g$, corresponding to the presence of a domain in the second TED 32 within the notch 40 of that device 32, will be present at the gate 14 of the first TED 10. As shown in FIG. 8(*b*), the output voltage, $v_o$, will return to the original quiescent level corresponding to the collection of thhe first domain nucleated, but the output voltage, $v_o$, will immediately drop due to the presence of the negative pulse in the gate voltage, $v_g$, at the gate 14 of the first TED 10.

It can be seen that the TED's 10, 32 will continue to trigger one another thereby keeping the output voltage, $v_o$, of the memory element 52 at an average voltage lower than that of the quiescent voltage. When it is desired to turn the memory element "OFF" at some time $\tau_6$, corresponding to the collection of a domain within the first TED 10, it will be necessary to suppress the negative pulse in the voltage waveform from the second TED 32 from further nucleating domains within the first TED 10. As shown in FIG. 8(*a*), this can be accomplished by imposing a positive input pulse upon the input terminal 64 at time $\tau_5$. The positive input pulse at the gate 14 of the TED 10 will suppress the nucleation of a domain within that device 10. Thus, the level of voltage on the output line 58 will be returned to the high quiescent "OFF" level by a positive pulse at the input 64 to the memory element 52. The timing and duration of the positive input pulse would be chosen to coincide with the collection of a domain within the first TED 10.

Figure 9:
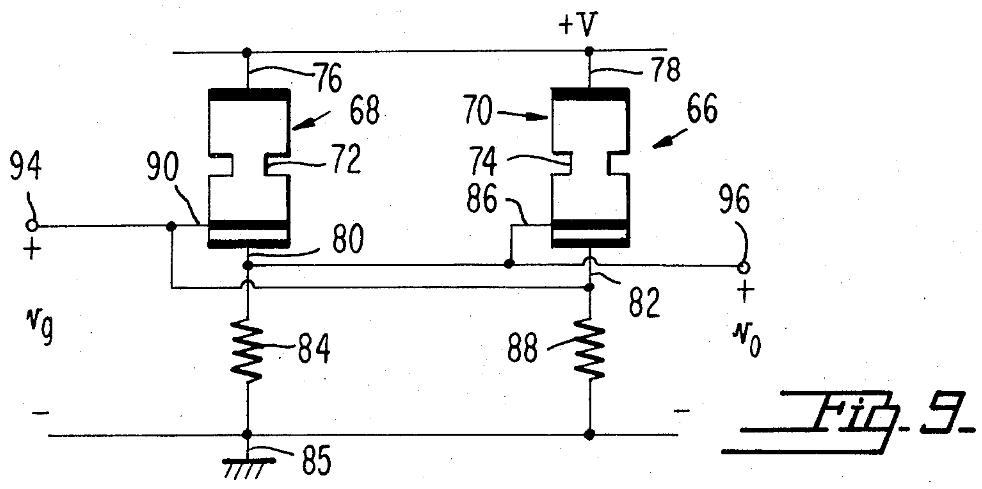
FIG. 9 is a schematic illustration of another embodiment of the present invention.

Referring generally to FIG. 9, another embodiment 66 of the present invention is shown. This embodiment 66 makes use of two identical notched TED's 68, 70. These TED's 68, 70 have notches 72, 74 which are located midway between their anodes 76, 78 and their cathodes 80, 82. The anodes 76, 78 are connected together and to a positive DC bias supply voltage, +V. The cathode 80 of one TED 68 is connected to one terminal of a resistor 84 and to the gate 86 of the other TED 70. The cathode 82 of the other TED 70 is connected to one terminal of a resistor 88 and in a feedback arrangement to the gate 90 of the first TED 68. The remaining terminals of the resistors 84, 88 are connected together and to a common ground terminal 85 to which the negative terminal of the bias supply is connected. An input terminal 94 is connected to the gate terminal 90 of the TEd 68. The output of the circuit 66 is the terminal 96 connected to the cathode 80 of the first TED 68.

The operation of the embodiment 66 is essentially the same as the operation of the embodiment 52 shown in FIG. 7. When an input pulse sufficient to nucleate a domain in the first TED 68 is imposed upon the input terminal 94, a domain will be nucleated within the first TED 68. When this domain has reached the notch 72 in the first TED, 68, there will be a voltage drop across the resistor 84 of sufficient magnitude to cause the nucleation of a domain with the second TED 70. Similarly, a domain traveling in the second TED 70 which reaches the notch 74 will cause a voltage drop across the resistor 88, thereby causing nucleation of domains within the first TED 68. This feedback triggering will continue until such time as a positive pulse is presented to the input terminal 94 of sufficient magnitude to prevent further domain nucleation within the first TED 68.

Figure 10:
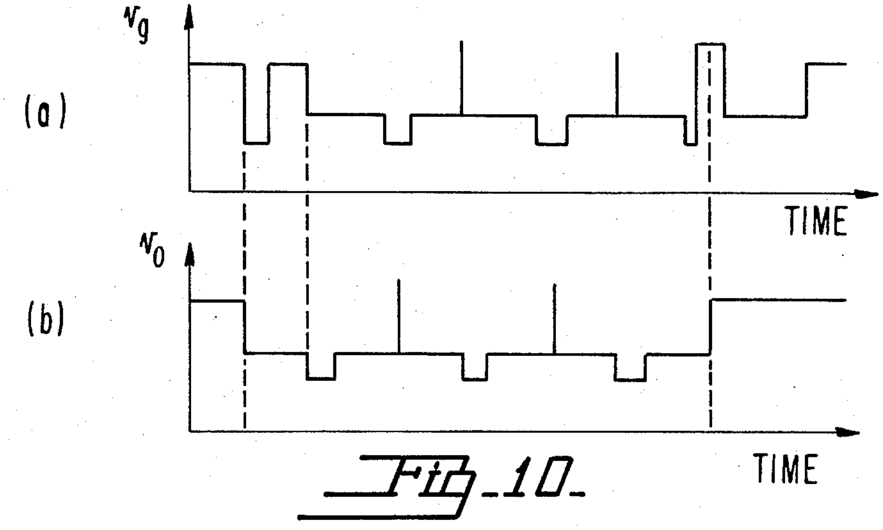
FIGS. 10(*a*) and (*b*) are voltage waveforms illustrating the operation of the circuit of FIG. 9.

Referring generally to FIGS. 10(*a*) and (*b*), there is shown in FIG. 10(*a*) the input pulses to the circuit 66 of FIG. 9 along with the gate voltage, $v_g$, measured between the gate 90 of the first TED 68 and ground in FIG. 10(*a*), and the output voltage, $v_o$, measured between the output terminal 96 and ground.

Figure 11:
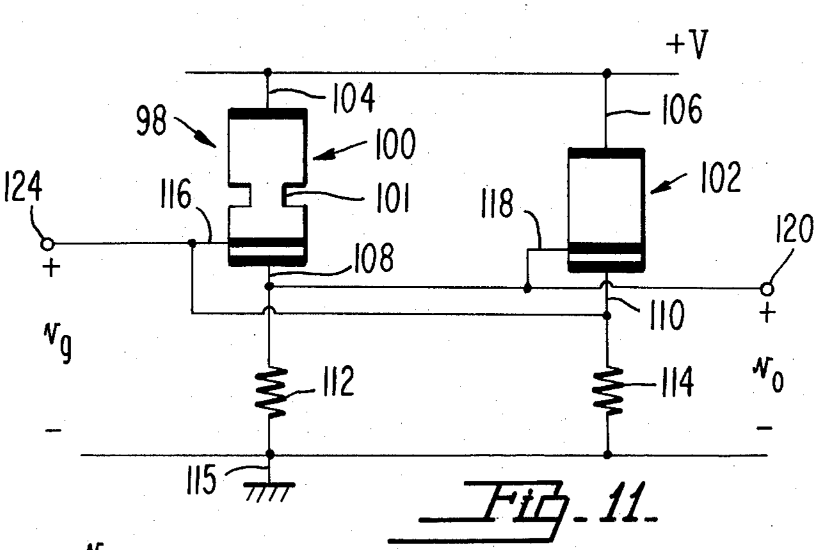
FIG. 11 is a schematic illustration of another embodiment of the present invention.

Referring generally to FIG. 11, still another embodiment 98 of the present invention is shown. This embodiment 98 comprises a notched TED 100 having a notch 101 and a conventional TED 102 having no notches. The conventional TED 102 is shorter in overall length than the shaped TED 100 for reasons which will be made clear. Each of the TED's 100, 102 has an anode terminal 104, 106 which is connected to the anode of the other device 102, 100 and to the positive terminal +V of a DC bias supply. The cathode terminals 108, 110 of the TED's 100, 102 are connected to resistors 112, 114 respectively. The gate 116 of the notched TED 100 is connected to the cathode 110 of the conventional TED 102. The gate 118 of the conventional TED 102 is connected to the cathode 108 of the notched TED 100 as well as to an output terminal 120. An input terminal 124 is connected to the gate 116 of the notched TED 100. The remaining terminals of the resistors 112, 114 are connected together to a ground terminal 115 to which the negative terminal of the DC bias supply is connected.

Figure 12:
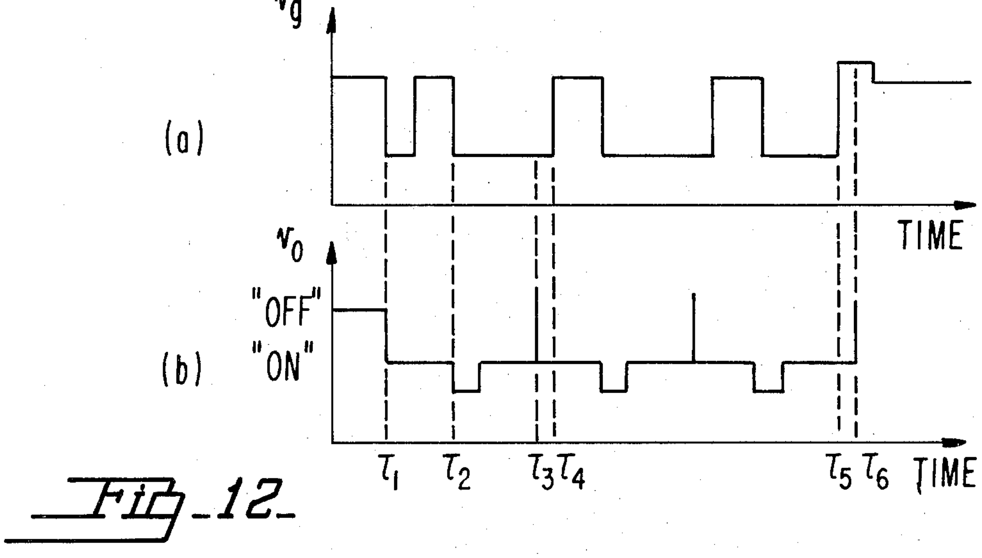
FIGS. 12(*a*) and (*b*) are voltage waveforms illustrating the operation of the circuit of FIG. 11.

Referring generally to FIGS. 12(*a*) and (*b*), the operation of the embodiment 98 of FIG. 11 can be seen. FIG. 12(*a*) shows the waveform of the gate voltage, $v_g$, between the gate 116 of the notched TED 100 and ground 115. FIG. 12(*b*) represents the output voltage, $v_o$, across the resistor 112. This output voltage, $v_o$, may be measured between the output terminal 120 and ground 115.

In the operation of the embodiment 98 shown in FIG. 11, an input pulse sufficient to nucleate a domain in the notched TED 100 is imposed upon input terminal 124 at time $\tau_1$. When a domain has been nucleated in the notched TED 100, the output voltage, $v_o$, will drop as shown in FIG. 12(*b*) corresponding to turning the memory element 98 "ON."

When the domain traveling in the notched TED 100 reaches the notch 101 in that device 100 at time $\tau_2$, the output voltage, $v_o$, will drop sufficiently to nucleate a domain within the conventional TED 102. The resistor 114 connected to the conventional TED 102, is chosen to have a value such that the presence of a domain within the conventional TED 102 will cause a domain nucleating voltage to be present as the gate voltage, $v_g$, at the gate 116 of the notched TED 100. Thus, when the domain traveling within the notched TED 100 reaches the anode 104, another domain will be immediately nucleated within this device 100, because the voltage at the gate 116 will be of sufficient magnitude to nucleate domains. Once a domain has been nucleated within the notched TED 100, the removal of the domain nucleating voltage from the gate 116 of that device 100 will not matter. Therefore, the length of the conventional TED 102 may be chosen to be smaller than the length of the notched TED 100 so that the domain which has been traveling within the conventional TED 102 is collected at time $\tau_4$ following the nucleation of a domain within the notched TED 100 at time $\tau_3$.

When it is desired to turn this circuit 98 "OFF," a positive pulse of sufficient magnitude will have to be presented in the input terminal 124 to offset the negative pulses from the conventional TED 102. The timing and duration of this positive input pulse will have to coincide with the collection of a domain within the notched TED 100 in order to prevent the nucleation of another domain within this device 100. Thus, as shown in FIG. 12(*a*), a positive pulse is presented to the input terminal 124 at time $\tau_5$ so that when the domain traveling within the notched TED 100 is collected at time $\tau_6$, no further domains will be nucleated within this device 100 and the memory element 98 will be turned "OFF." It can be seen that this embodiment 98 differs from the other embodiments shown in that only one notched device 102 is needed, and there are no extreme timing constraints upon the devices 100, 102.

I claim:

1. A semiconductor memory element comprising:

a. a first circuit having an output terminal for producing an output voltage and an input terminal for receiving an input signal and including a first transferred electron device having:
   i. an anode,
   ii. a cathode, and
   iii. means between said anode and said cathode responsive to the arrival thereat of a traveling domain for causing a change in the output voltage produced by said device;

b. a second circuit having an output terminal for producing an output voltage and an input terminal for receiving an input signal and including a transferred electron device having:

i. an anode, and
ii. a cathode, c. means coupled to said input terminal of each of said circuits for establishing a domain within its associated transferred electron device which domain travels from said cathode of said device toward the anode thereof;

d. means coupled between said output terminal of said first circuit and said input terminal of said second circuit responsive to said change in output voltage of said first circuit which change occurs when said traveling domain reaches said means between said anode and said cathode of said first device for establishing a domain in said second device which travels from said cathode toward said anode of said second device; and e. means coupled between said output terminal of said second circuit and said input terminal of said first circuit responsive to the establishment of said domain in said second device for establishing a domain in said first device which travels from the cathode toward the anode of said second device.

2. The semiconductor memory element of claim 1 wherein said means between said anode and said cathode of said first device responsive to the arrival thereat of a traveling domain comprises a notch in said device.

3. The semiconductor memory element of claim 1 wherein the length of said second device is greater than the distance between the cathode and the edge of said notch proximate the anode of said first device and is less than the length of said first device.

4. The semiconductor memory element of claim 1 further comprising:

a. means between said anode and said cathode of said second transferred electron device responsive to the arrival thereat of a traveling domain for causing a change in the output voltage produced by said device;

b. means coupled between said output terminal of said second circuit and said input terminal of said first circuit responsive to said change in output voltage of said second circuit which change occurs when said traveling domain reaches said means between said anode and said cathode of said second device for establishing a domain in said first device which travels from said anode toward said cathode of said first device.

5. The semiconductor memory element of claim 4 wherein said means between said anode and said cathode responsive to the arrival thereat of a traveling domain for causing a change in the output voltage produced by said device comprises a notch in said device.

6. The semiconductor memory element of claim 5 wherein said notch in each of said transferred electron devices is spaced midway between said anode and said cathode of said device.

7. The semiconductor memory element of claim 5 wherein said notch of said first transferred electron device is located proximate said anode of said device and said notch of said second transferred electron device is located proximate said cathode of said device.

8. The semiconductor memory element of claim 5 wherein each of said transferred electron devices are of the same length.

9. The semiconductor memory element of claim 4 further comprising means for biasing said transferred electron device comprising a DC voltage supply having a positive terminal connected to said anode terminal of each of said transferred electron devices and a negative terminal connected to a pair of resistors each of which is connected to a separate one of said cathode terminals of said transferred electron devices.

10. The semiconductor memory element of claim 4 wherein said means coupled to said input terminal of each of said circuits for establishing a domain within each of said transferred electron devices comprises a gate electrode.

11. The semiconductor memory element of claim 10 wherein said gate electrode comprises a Schottky barrier gate.

* * * * *